(12) United States Patent
Engelman et al.

(10) Patent No.: US 9,802,566 B2
(45) Date of Patent: Oct. 31, 2017

(54) ADAPTIVE SUPPRESSION OF VEHICLE RESTRAINT SYSTEM

(71) Applicant: Ford Global Technologies, LLC, Dearborn, MI (US)

(72) Inventors: Gerald H. Engelman, Plymouth, MI (US); Alex Maurice Miller, Canton, MI (US); Brian Robert Spahn, Plymouth, MI (US); Richard Lee Stephenson, Ann Arbor, MI (US); Levasseur Tellis, Southfield, MI (US); Timothy D. Zwicky, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/994,207

(22) Filed: Jan. 13, 2016

(65) Prior Publication Data

US 2016/0121835 A1   May 5, 2016

Related U.S. Application Data

(62) Division of application No. 14/215,404, filed on Mar. 17, 2014, now Pat. No. 9,266,487.

(51) Int. Cl.

| | | |
|---|---|---|
| *B60R 21/015* | (2006.01) |
| *B60R 21/013* | (2006.01) |
| *B60R 21/23* | (2006.01) |
| *G06K 9/00* | (2006.01) |
| *B60R 21/00* | (2006.01) |
| *B60R 21/01* | (2006.01) |

(52) U.S. Cl.
CPC ...... *B60R 21/01554* (2014.10); *B60R 21/013* (2013.01); *B60R 21/01556* (2014.10); *B60R 21/23* (2013.01); *G06K 9/00838* (2013.01); *B60R 2021/0032* (2013.01); *B60R 2021/01013* (2013.01); *B60R 2021/01286* (2013.01)

(58) Field of Classification Search
CPC ............ B60R 21/015; B60R 21/01554; B60R 21/01556; B60N 2/002; B60N 2/2857; G06K 9/00838
USPC ............................................ 280/735; 701/45
See application file for complete search history.

(56) References Cited

U.S. PATENT DOCUMENTS

| | | | |
|---|---|---|---|
| 5,893,582 | A | 4/1999 | Allen et al. |
| 6,236,035 | B1 | 5/2001 | Saar et al. |
| 6,302,438 | B1 | 10/2001 | Stopper, Jr. et al. |
| 6,323,487 | B1 | 11/2001 | Wu |
| 7,976,060 | B2 | 7/2011 | Breed |
| 8,041,469 | B2 | 10/2011 | Kellum et al. |
| 2002/0166710 | A1 | 11/2002 | Breed |
| 2007/0267848 | A1 | 11/2007 | Harase et al. |

FOREIGN PATENT DOCUMENTS

| | | |
|---|---|---|
| DE | 102010054743 | 6/2012 |
| FR | 2943961 | 10/2010 |
| GB | 2425720 | 9/2008 |

*Primary Examiner* — Keith J Frisby
(74) *Attorney, Agent, or Firm* — Frank A. MacKenzie; Bejin Bieneman PLC

(57) ABSTRACT

A vehicle has a restraint system with at least two restraint devices. A sensor detects a potential collision object and outputs a signal representing a relative position of the potential collision object to the vehicle. A processing device suppresses deployment of at least one of the restraint devices based at least in part on the signal output by the at least one sensor.

15 Claims, 4 Drawing Sheets

ADAPTIVE SUPPRESSION OF VEHICLE RESTRAINT SYSTEM

BACKGROUND

Vehicles include restraint systems to reduce injuries to vehicle occupants during a collision. Restraint systems are not always deployed, however. For example, certain restraint systems are disabled unless a passenger is detected in a seat and the passenger is over a certain size or weight. Existing restraint systems, however, assume that all seats in the vehicle, and in particular the front seats, are always forward facing. Therefore, existing restraint systems may not be adequate for autonomous vehicles or other types of vehicles that could have dynamic seat configurations.

DETAILED DESCRIPTION

An exemplary vehicle has a restraint system with at least two restraint devices. A sensor detects a potential collision object and outputs a signal representing a relative position of the potential collision object to the vehicle. A processing device suppresses deployment of at least one of the restraint devices based at least in part on the signal output by the at least one sensor. Moreover, certain restraint devices can be selectively disabled based on the seat configuration. Accordingly, only those restraint devices (e.g., airbags) that will be able to assist during a vehicle collision may be enabled.

The system shown in the FIGS. may take many different forms and include multiple and/or alternate components and facilities. While an exemplary system is shown, the exemplary components illustrated are not intended to be limiting. Indeed, additional or alternative components and/or implementations may be used.

Figure 1A:
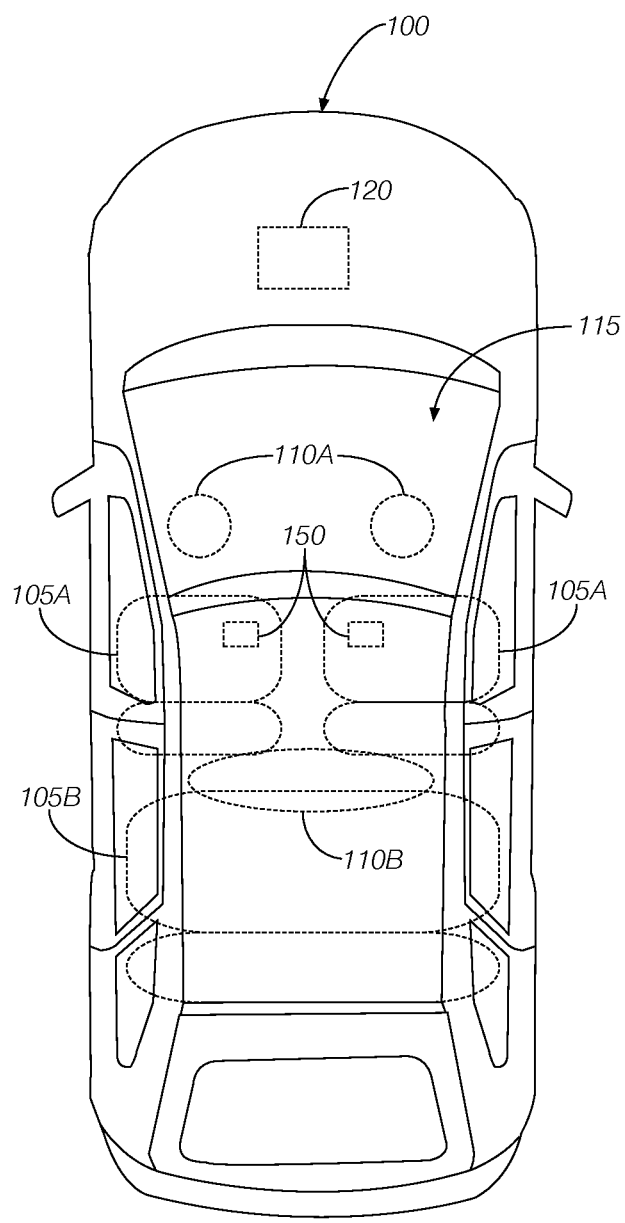
FIGS. 1A and 1B illustrate an exemplary vehicle configured to adaptively suppress a restraint system.
Figure 1B:
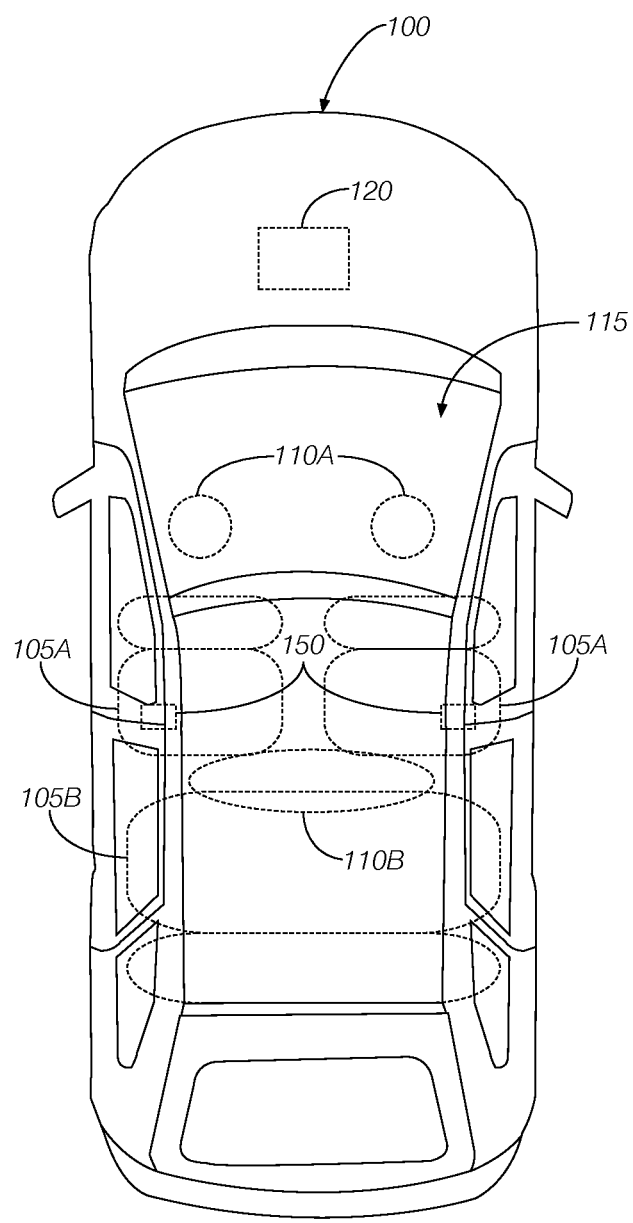

As illustrated in FIGS. 1A and 1B, the vehicle 100 includes reconfigurable seats 105, including front seats 105A and a rear seat 105B, and multiple restraint devices 110, including a pair of first restraint devices 110A and a second restraint device 110B. The seats 105 may be located in a passenger compartment 115, and at least some of the seats 105 may be configured to move from a front-facing position to a rear-facing position. FIG. 1A shows all seats 105 in the front-facing position and FIG. 1B shows the front seats 105A in the rear-facing position. The restraint devices 110 may include any device configured to cushion an occupant during a collision. Therefore, examples of restraint devices 110 may include airbag, seat 105 belts, or the like. The vehicle 100 may further include a system 120 for detecting a potential collision object and actively suppressing at least one of the restraint devices 110 based on a configuration of the seats 105 and the potential direction of impact or force that would be applied to the vehicle 100 if the collision object were to collide with the vehicle 100. Although illustrated as a sedan, the vehicle 100 may include any passenger or commercial vehicle such as a car, a truck, a sport utility vehicle, a taxi, a bus, etc. In some implementations, the vehicle 100 is an autonomous (e.g., self-driving) or partially autonomous vehicle.

Figure 2:
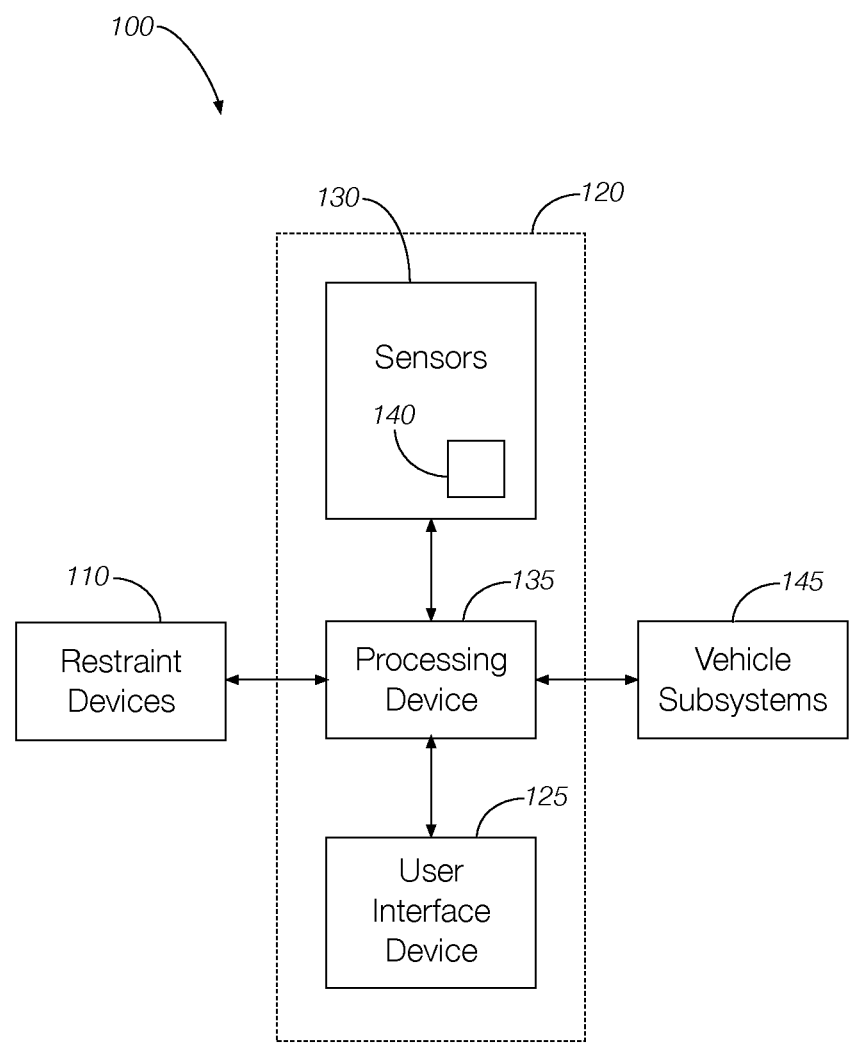
FIG. 2 is a block diagram of an exemplary system that may be incorporated into the vehicle of FIGS. 1A and 1B.

FIG. 2 is a block diagram of an exemplary system 120 for detecting a potential collision object and actively suppressing one or more restraint devices 110. The system 120, as shown in FIG. 2, includes a user interface device 125, at least one sensor 130, and a processing device 135.

The user interface device 125 may be configured to present information to and/or receive inputs from a user, such as a driver, during operation of the vehicle 100. Thus, the user interface device 125 may be located in the passenger compartment 115 of the vehicle 100. In some possible approaches, the user interface device 125 may include a touch-sensitive display screen.

The sensors 130 may include any number of devices configured to generate signals that help during operation of the vehicle 100. For instance, in the instance of an autonomous vehicle 100, that is, a vehicle 100 capable of operating in an autonomous (e.g., driverless) or partially autonomous mode, the sensors 130 may include a radar sensor, a lidar sensor, a camera, or the like. The sensors 130 may help the vehicle 100 "see" the roadway and/or negotiate various obstacles while the vehicle 100 is operating in the autonomous mode. Even when operating in a non-autonomous mode, the sensors 130 may be configured to help identify the presence and location of potential collision objects. Examples of collision objects may include other vehicles, infrastructure devices such as bridges, walls, and other inanimate objects, traffic control devices such as signs, debris in the roadway, etc. Upon detecting a potential collision object, the sensor 130 may be configured to output a signal representing a relative position of the potential collision object. The relative position may be, e.g., the position of the potential collision object relative to the vehicle 100, which may include a distance between the potential collision object and the vehicle 100 as well as a direction or angle of the potential collision object relative to the vehicle 100. With the relative position, the processing device 135 can determine a possible or likely direction of impact or force if the potential collision object were to collide with the vehicle 100.

Another type of sensor 130 included in the vehicle 100 may include a communication module 140. The communication module 140 may be configured to transmit messages to and/or receive messages from other vehicles 100. The communication module 140 may be configured to communicate in accordance with any number of communication protocols. For example, the communication module 140 may be configured to communicate according to one or more of a Dedicated Short-Range Communication (DSRC) protocol, the Bluetooth® protocol, WiFi, or the like. The communication module 140 may be configured to receive communication signals from, e.g., the potential collision object. Examples of communication signals may include a signal that indicates a position of the potential collision object. The processing device 135 may determine the relative position of the potential collision object from the position sent via the communication signal. Although shown as one of the sensors 130, the communication module 140 may alternatively be separate from the sensors 130.

In the context of autonomous vehicles 100, the processing device 135 may be configured to control one or more subsystems 145 while the vehicle 100 is operating in the autonomous mode. Examples of subsystems 145 that may be controlled by the processing device 135 may include a brake subsystem, a suspension subsystem, a steering subsystem, and a powertrain subsystem. The processing device 135 may control any one or more of these subsystems 145 by outputting signals to control units associated with these subsystems 145. The processing device 135 may control the subsystems 145 based, at least in part, on signals generated by the sensors 130. Moreover, the processing device 135 may be configured to determine the orientation of the seats 105 in the vehicle 100. For instance, the processing device 135 may be configured to determine which, if any, of the seats 105 are in a front-facing position and which, if any, of the seats 105 are in a rear-facing position based on signals received from seat sensors 150.

Whether operating in the autonomous mode or the non-autonomous mode, the processing device 135 may be configured to control the operation of certain restraint devices 110. For instance, based on signals received from the sensor 130, which may include the communication module 140, the processing device 135 may determine a possible or likely principal direction of impact or force that would be applied to the vehicle 100 if, e.g., the potential collision object were to collide with the vehicle 100. The processing device 135 may be configured to suppress deployment of at least one of the restraint devices 110 based on, e.g., the position signal received from the sensor 130.

Moreover or as an alternative approach, the processing device 135 may be configured to suppress deployment of at least one of the restraint devices 110 based on, e.g., the configuration of the seats 105. Thus, some restraint devices 110, such as the first restraint devices 110A, may only be deployed following a collision with the seats 105 in the front-facing position while other restraint devices 110, such as the second restraint device 110B, may only be deployed following a collision with the seats 105 in the rear-facing position.

In general, computing systems and/or devices, such as the user interface device 125 and the processing device 135, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle 100 computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
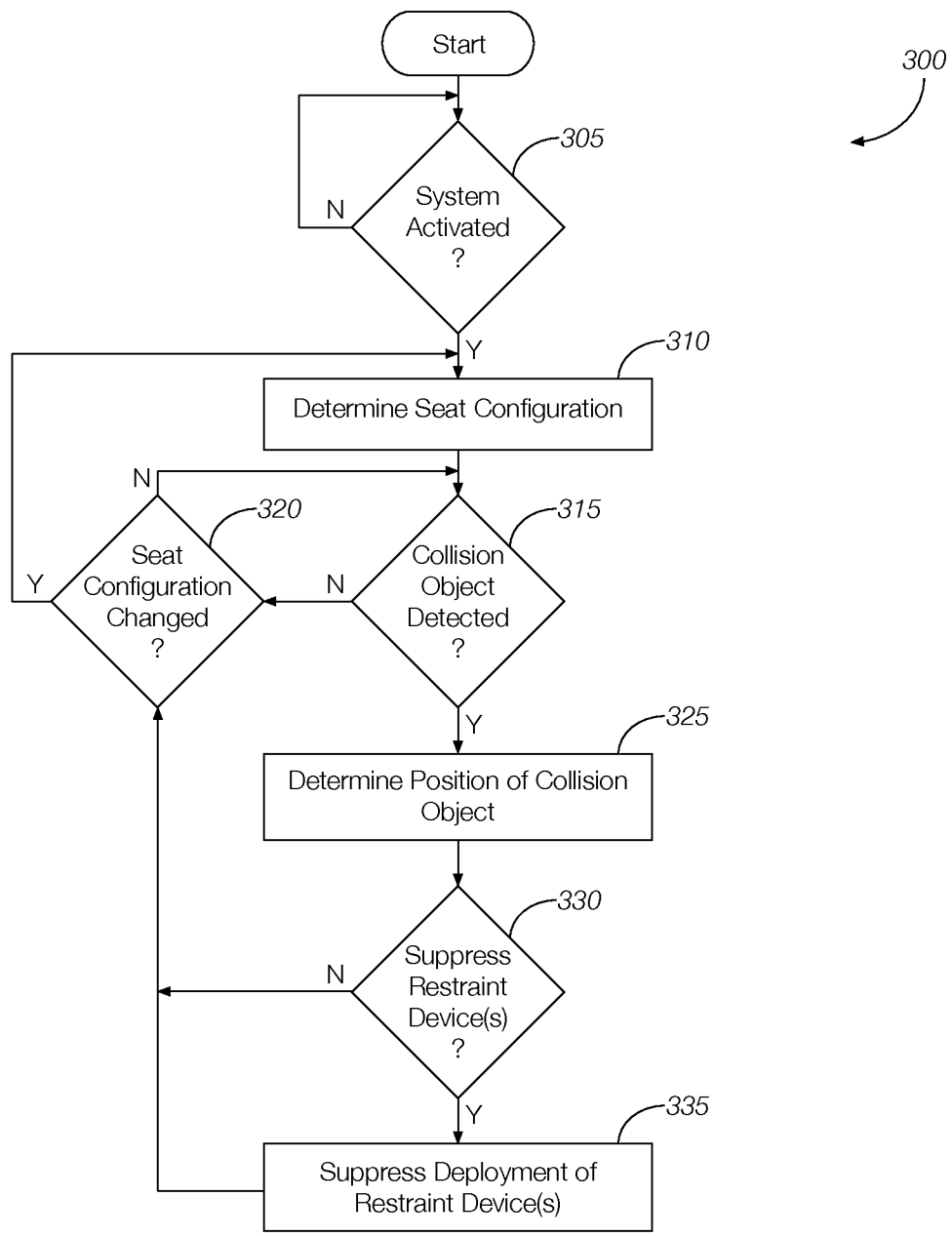
FIG. 3 is a flowchart of an exemplary process that may be used to adaptively suppress the restraint system.

FIG. 3 is a flowchart of an exemplary process 300 that may be implemented by one or more components of the system 120 of FIG. 2. For example, the process 300 may be executed by the processing device 135 while the vehicle 100 is running or until deactivated by a user.

At decision block 305, the processing device 135 may determine whether the system 120 has been activated. The system 120 may be activated by, e.g., default or in response to a user input received via the user input device. Moreover, the system 120 may be deactivated in response to a user input. If the system 120 has been activated, the process 300 may continue at block 310. If the system 120 has been deactivated, the process 300 may end.

At block 310, the processing device 135 may determine the seat 105 configuration. The seat 105 configuration may be determined from signals received from a controller, which may be the processing device 135, configured to control the direction of the seats 105. Alternatively or in addition, the seat 105 configuration may be determined from a seat sensor 150. The seat 105 configuration may indicate that one or more seats 105 are in a front-facing position and one or more seats 105 are in a rear-facing position.

At decision block 315, the processing device 135 may determine whether a potential collision object has been detected. Whether a potential collision object has been detected may be determined from, e.g., one or more signals output by the sensors 130. Thus, determining whether a potential collision object has been detected may include receiving a position signal that indicates the position of one or more potential collision objects. The position signal may indicate the distance and/or direction of the potential collision object relative to the vehicle 100. In some implementations, the position signal may be received via a communication signal transmitted to the communication module 140. If a potential collision object is detected, the process 300 may continue at block 325. If no potential collision objects are detected, the process 300 may continue at decision block 320.

At decision block 320, the processing device 135 may determine whether the seat 105 configuration has changed based on, e.g., signals received from a seat sensor 150. If the seat 105 configuration has changed, the process 300 may continue at block 310. If the seat 105 configuration has not changed, the process 300 may continue at decision block 315.

At block 325, the processing device 135 may determine the position of the potential collision object. The position of the potential collision object may include a distance and/or direction of the potential collision object relative to the vehicle 100. The position of the potential collision object may indicate a principal direction of force that would be applied to the vehicle 100 if the potential collision object were to collide with the vehicle 100.

At decision block 330, the processing device 135 may determine whether to suppress one or more restraint devices 110 based on, e.g., the position signal and the seat 105 configuration. If the processing device 135 determines that one or more restraint devices 110 should be suppressed, the process 300 may continue at block 335. If no restraint devices 110 are to be suppressed, the process 300 may continue at block 320.

At block 335, the processing device 135 may suppress deployment of one or more restraint devices 110 based on the position signal and the seat 105 configuration. Therefore, the processing device 135 may enable the restraint devices 110 most likely to provide the greatest protection if the potential collision object were to collide with the vehicle 100. Suppressing the deployment of one or more restraint devices 110 may include, for example, disabling one or both of the first restraint devices 110A when the front seats 105A are in a rear-facing position while a second restraint device 110B remains enabled. The process 300 may continue at block 320 to determine whether the seat 105 configuration has changed.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   determining a seat configuration in a vehicle including detecting a rear facing front seat;
   detecting a potential collision object;
   receiving a position signal representing a position of the potential collision object relative to the vehicle; and
   suppressing deployment of at least one restraint device based at least in part on the position signal representing the position of the potential collision object and the seat configuration.

2. The method of claim 1, wherein the position signal indicates a principal direction of force applied to the vehicle if the potential collision object were to collide with the vehicle.

3. The method of claim 1, wherein suppressing deployment of the at least one restraint device is based at least in part on detecting the rear facing front seat.

4. The method of claim 1, wherein the position signal indicates a distance between the potential collision object and the vehicle.

5. The method of claim 1, wherein the position signal indicates a direction of the potential collision object relative to the vehicle.

6. The method of claim 1, wherein detecting the potential collision object includes receiving a communication signal from the potential collision object.

7. The method of claim 6, wherein the position of the potential collision object is determined from the communication signal.

8. A method comprising:
   determining an initial seat configuration of a host vehicle, the initial seat configuration including at least one seat facing a first direction while the host vehicle is operating in an autonomous mode;
   determining a new seat configuration of the host vehicle, the new seat configuration including the at least one seat facing a second direction while the host vehicle is operating in the autonomous mode;
   detecting a potential collision object external to the host vehicle;
   receiving a position signal representing a position of the potential collision object relative to a vehicle; and
   suppressing deployment of at least one restraint device based at least in part on the position signal representing the position of the potential collision object and the new seat configuration.

9. The method of claim 8, wherein the position signal indicates a principal direction of force applied to the host vehicle if the potential collision object were to collide with the vehicle.

10. The method of claim 8, wherein determining the initial seat configuration includes receiving a first signal output by at least one seat sensor representing the configuration of the at least one seat.

11. The method of claim 10, wherein determining the initial seat configuration includes receiving a second signal output by the at least one seat sensor representing the configuration of the at least one seat.

12. The method of claim 8, wherein the position signal indicates a distance between the potential collision object and the vehicle.

13. The method of claim 8, wherein the position signal indicates a direction of the potential collision object relative to the vehicle.

14. The method of claim 8, wherein detecting the potential collision object includes receiving a communication signal from the potential collision object.

15. The method of claim 14, wherein the position of the potential collision object is determined from the communication signal.

* * * * *